United States Patent [19]
Sata

[11] Patent Number: 5,267,058
[45] Date of Patent: Nov. 30, 1993

[54] ORIGINAL FEEDING AND READING APPARATUS IN WHICH THE ORIGINAL IS PRESSED AGAINST THE IMAGE SENSOR

[75] Inventor: Junichi Sata, Kawasaki, Japan

[73] Assignee: Canon Kabushiki Kaisha, Tokyo, Japan

[21] Appl. No.: 562,932

[22] Filed: Aug. 6, 1990

[30] Foreign Application Priority Data

Aug. 4, 1989 [JP] Japan ................... 1-202432

[51] Int. Cl.$^5$ .................... H04N 1/40
[52] U.S. Cl. .................... 358/498; 358/496
[58] Field of Search .............. 358/488, 496, 498; 271/111; 355/48, 75, 231

[56] References Cited

U.S. PATENT DOCUMENTS

| | | | |
|---|---|---|---|
| 3,510,125 | 5/1970 | Krueger et al. | 271/227 |
| 3,890,049 | 6/1975 | Collins et al. | 250/227.11 |
| 3,932,755 | 1/1976 | Sagawa | 250/349 |
| 4,200,391 | 4/1980 | Sakamoto et al. | 250/305 |
| 4,300,169 | 11/1981 | Sato | 358/488 |
| 4,352,553 | 10/1982 | Hirahara | 250/204 |
| 4,438,918 | 3/1984 | Ito et al. | 271/251 |
| 4,444,382 | 4/1984 | Ishikawa et al. | 271/111 |
| 4,446,364 | 5/1984 | Hayashi et al. | 250/208.1 |
| 4,451,864 | 5/1984 | Prodinger | 360/130.33 |
| 4,475,128 | 10/1984 | Koumura | 353/496 |
| 4,544,258 | 10/1985 | Takano | 250/216 |
| 4,560,866 | 12/1985 | Takenouchi et al. | 250/208.1 |
| 4,729,036 | 3/1988 | Ikeda et al. | 358/498 |
| 4,743,976 | 5/1988 | Katakabe et al. | 358/497 |
| 4,768,100 | 8/1988 | Kunishima et al. | 358/498 |
| 4,805,032 | 2/1989 | Watanabe et al. | 358/493 |
| 4,811,049 | 3/1989 | Honjo et al. | 271/3.1 |
| 4,839,740 | 6/1989 | Yoshida | 358/498 |
| 4,953,037 | 7/1990 | Ito et al. | 358/498 |

Primary Examiner—Edward L. Coles, Sr.
Assistant Examiner—Thomas L. Stoll
Attorney, Agent, or Firm—Fitzpatrick, Cella, Harper & Scinto

[57] ABSTRACT

An original device includes an image reader having a guide surface for guiding an image surface of an original for reading an image on the original being guided by the guide surface. A first feeder feeds the original while pressing the original against the guide surface of the image reader. A driver drives the first feeder, and a second feeder is provided downstream of the first feeder in an original feeding direction for feeding the original fed by the first feeder. Control circuitry is provided for controlling the driver such that the first feeder is stopped before a trailing edge of the original fed by the second feeder has passed through an area between the first feeder and the image reader. By thus stopping the first feeder, undue wear on the first feeder and the guide surface is prevented.

31 Claims, 12 Drawing Sheets

ORIGINAL FEEDING AND READING APPARATUS IN WHICH THE ORIGINAL IS PRESSED AGAINST THE IMAGE SENSOR

BACKGROUND OF THE INVENTION

1. Field of the Invention

The present invention relates to an image forming system such as a scanner, a facsimile machine or the like, and, more particularly, it relates to an original feeding and reading apparatus in which an image recorded on an original is read while feeding the original.

2. Related Background Art

In the past, original feeding and reading apparatuses which read an image recorded on an original are already known, as disclosed in U.S. Pat. Nos. 4,446,364 and 4,805,032, and Japanese Patent Laid-Open No. 58-127463. An example of such apparatus will be explained with reference to FIG. 12.

Figure 12:
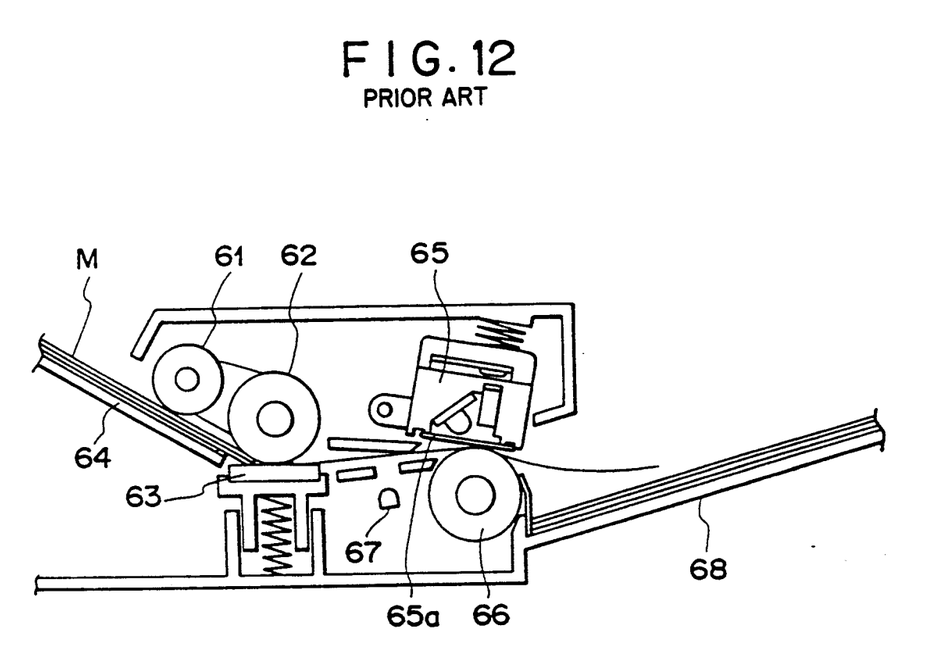
FIG. 12 is a sectional elevational view of a conventional original feeding and reading apparatus.

The apparatus comprises a pick-up roller 61 for shifting a plurality of originals M stacked in an original tray 64 downstream, a feed roller 62 for feeding the shifted original M downstream one by one, and a separating pad 63 for separating the original M to be fed from the other originals. These elements 61-63 are disposed in the vicinity of an outlet of the original tray 64. Downstream of these elements, an image sensor 65 the contact type and a conveying roller 66 pressed against the image sensor 65 for feeding the original are arranged. Elements 65, 66 read an image recorded on the original while pinching and feeding the original. Further, an original detecting sensor 67 is arranged at an upstream side of the image sensor 65, and the conveying roller 66 is driven in response to a detection signal from the detecting sensor 67, while the image sensor 65 reads image information on the original. After the reading operation has been finished, the original M is ejected onto an ejector tray 68.

However, in the above-mentioned conventional original feeding and reading apparatus, since the original M is pinched and fed by the urging contact between the image sensor 65 the contact type and the conveying roller 66, the conveying roller 66 continues to frictionally drive the original M so long as the original M is pinched and fed by these elements 65, 66, with the result that there arise problems that the roller 66 and a guide member 65a of the image sensor 65 wear away and that a driving source of the roller 66 is subjected to a large load. In order to alleviate these problems, there has been proposed a technique in which the wear of the conveying roller 66 and the load of the driving source are reduced by using a guide member 65a made of low friction material with respect to the conveying roller 66, but this technique resulted in a considerable increase in the cost of the apparatus.

Further, an apparatus wherein conveying means are arranged at upstream and downstream sides of the image sensor 65 the contact type and a means for lightly contacting the original M against the image sensor 65 to reduce the load has also been proposed However, this apparatus was large-sized and expensive.

SUMMARY OF THE INVENTION

An object of the present invention is to provide an original reading apparatus which can reduce the wear of a conveying roller and the driving load by designing apparatus so that the conveying roller is not driven during the ejection of the original (i.e., while image information such as character information, symbol information and the like is not being read).

BRIEF DESCRIPTION OF THE DRAWINGS

FIGS. 2 and 3 are sectional plan views of a drive transmitting mechanism of the apparatus of FIG. 1, where

DESCRIPTION OF THE PREFERRED EMBODIMENTS

The present invention will now be explained with reference to the accompanying drawings First of all, a preferred embodiment of the present invention will be described referring to FIGS. 1 to 6.

Figure 1:
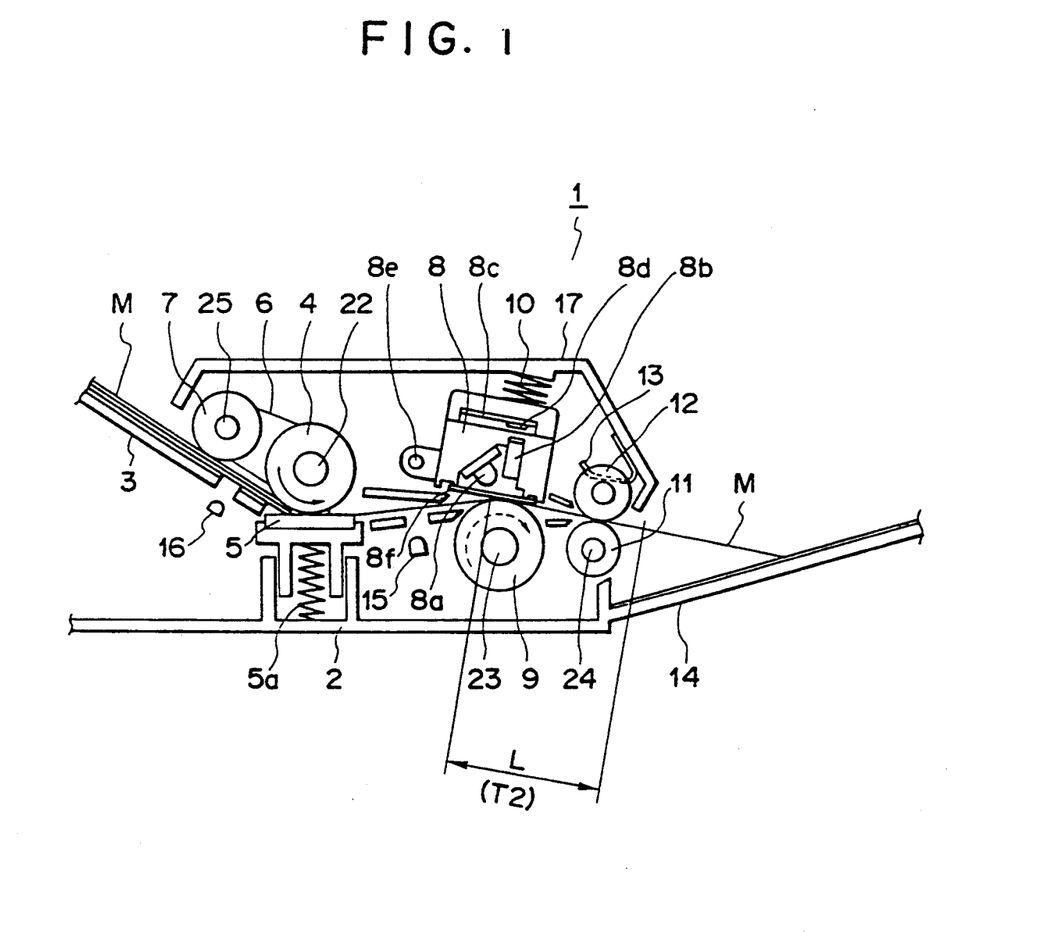
FIG. 1 is a sectional elevational view of an original feeding and reading apparatus according to a preferred embodiment of the present invention.

As shown in FIG. 1, an original feeding and reading apparatus 1 is installed on a frame 2 of a facsimile device. Feed rollers 4 are disposed in the vicinity of an outlet of a left side original tray 3, and a separating pad 5 is pressed against the feed rollers 4 through a spring 5a. At a left side of the rollers 4, pick-up rollers 7 are mounted on rocker arms 6 pivotally supported by the feed rollers 4 to pick up an original M stacked in the tray 3. At a downstream side of the feed rollers 4, a downwardly facing image sensor 8 of contact type is supported by a body cover 17 through a spring 10, and a conveying roller 9 is disposed in confronting relation to the image sensor 8. The image sensor 8 is pressed against the conveying roller 9 by the spring 10.

The image sensor 8 has an LED array 8a acting as a light source, and photoelectric converting elements 8d arranged on a base member 8c for receiving light emitted from the light source and reflected by the original M to convert it into an electric signal. The image sensor 8 further includes an lens array 8b for focusing the light reflected by the original M onto the photoelectric converting element 8d, and a transparent guide member 8f made of glass and the like for guiding the original M to pass through a predetermined position spaced apart from the lens array 8b by a predetermined distance. The image sensor 8 is pivotally supported by a rotary shaft 8e.

The LED array 8a, lens array 8b and photoelectric converting elements 8d are disposed along straight lines parallel to a rotation axis of the conveying roller 9 or a contacting line (nip line) between the conveying roller 9 and the guide member 8f through the whole width of the original to be fed, and the contacting line is so selected that it coincides with a reading line (a line on the original to be read) of the image sensor 8. Further, ejector rollers 11 are disposed at a downstream side of the conveying roller 9, and a driven ejector roller 12 is arranged in confronting relation to the ejector rollers 11 and is pressed against the latter by a spring 13. Incidentally, in FIG. 1, the reference numeral 14 denotes an ejector tray. A sensor 15 is arranged at an upstream side of the conveying roller 9, and a sensor 16 is arranged below the original tray 3, these sensors 15, 16 detecting the presence/absence of the original Next, a drive transmitting mechanism 18 will be explained with reference to FIG. 2.

Figure 2:
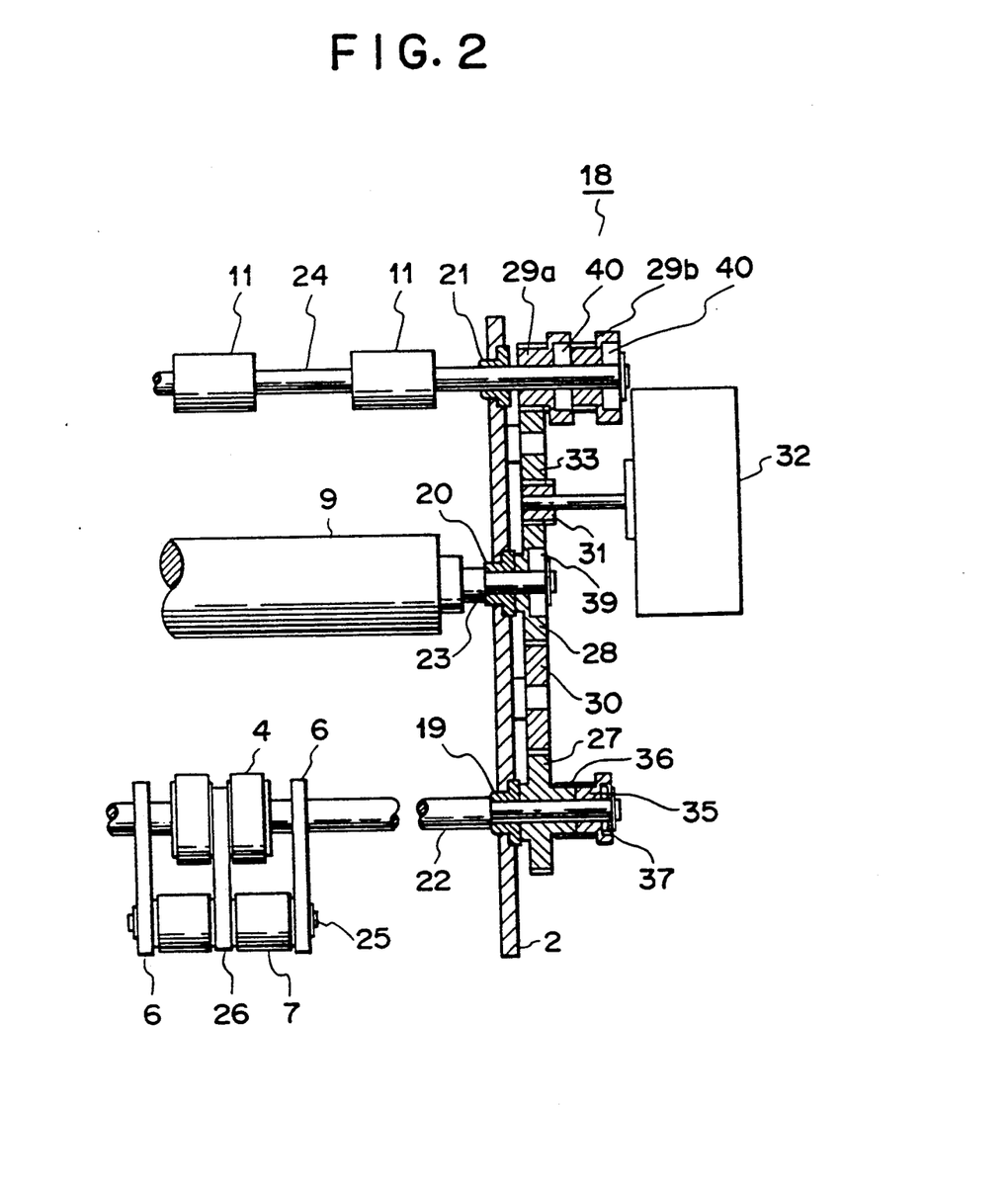
FIG. 2 is a section taken along the line D—D of FIG. 4.

Shafts 22, 23 and 24 are rotatably supported by the frame 2 acting as a side wall of the apparatus 1 through bearings 19, 20 and 21, respectively. Inside the shaft 22, a pair of feed rollers 4 are attached to this shaft 22, and a pair of rocker arms 6 mounted on the shaft 22 on both sides of the feed rollers 4 support a shaft 25 on which a pair of pick-up rollers 7 are rotatably mounted. The shaft 22 is drivingly connected to the shaft 25 through a belt 26. Further, inside the shaft 23, the conveying rollers 9 is attached to this shaft 23, and, inside the shaft 24, a pair of ejector rollers 11 are attached to this shaft 24.

Further, outside the shaft 22, a gear 27 is rotatably mounted on this shaft 22, and, outside the shaft 23, a gear 28 is rotatably mounted on this shaft 23, and, outside the shaft 24, two gears 29a and 29b are rotatably mounted on this shaft 24.

Further, an idle gear 30 meshed with the gears 27, 27 is rotatably supported by the frame 2, and a motor 32 having a motor shaft on which a pinion 31 meshed with the gear 28 is fixed is attached to the frame 2. The pinion 31 is also drivingly connected to the gear 29a through an idle gear 33 rotatably supported by the frame 2.

Figure 3:
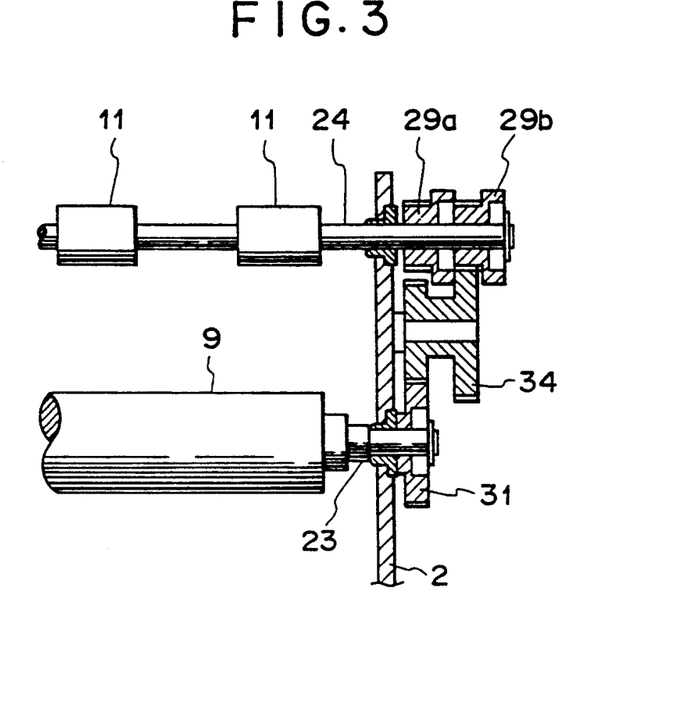
FIG. 3 is a section taken along the line C—C of FIG. 4.

Further, as shown in FIG. 3, an internal gear portion of an idle gear 34 rotatably supported by the frame 2 is meshed with the pinion 31, and an external gear portion of the idle gear 34 is meshed with the gear 29b.

Figure 4:
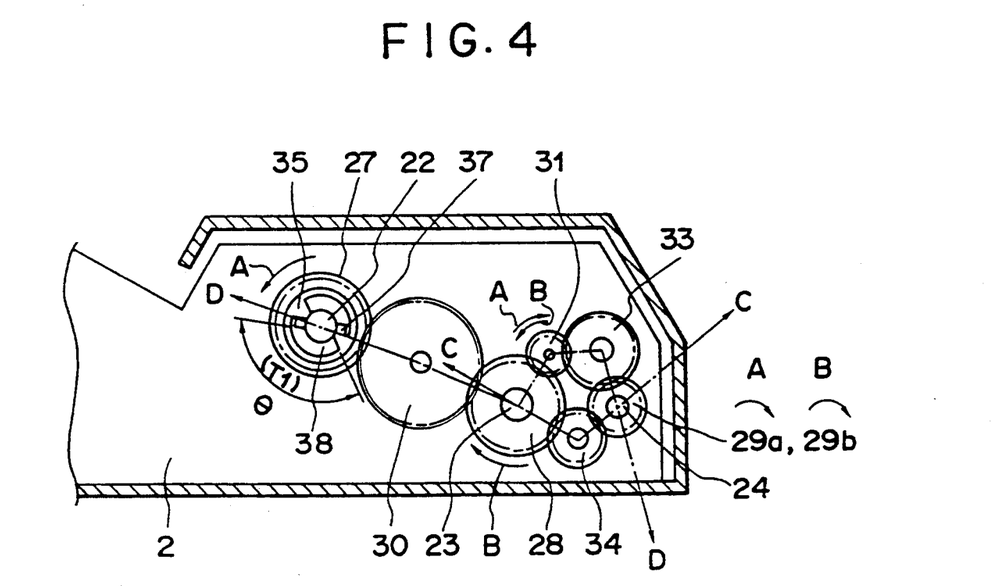
FIG. 4 is a sectional elevational view of the drive transmitting mechanism.

In addition, as shown in FIG. 4, a clutch barrel 35 having the same diameter as a boss of the gear 27 is rotatably mounted on an outboard end of the shaft 22, and a spring clutch 36 is attached to the boss of the gear 27 and the clutch barrel 35. A pin 37 fixed to an end of the shaft 22 is received in a groove or recess 38 formed in an end surface of the clutch barrel 35 in such a manner that the pin 37 can be rotated by $\theta$ degrees with respect to the clutch barrel 35. A free wheel 39 (FIGS. 2 and 5) is arranged between the gear 28 and the shaft 23, and two other free wheels 40 (FIGS. 2 and 5) are arranged between the gear 29a and the shaft 23 and between the gear 29b and the shaft 23, respectively. The spring clutch 36 (FIG. 2) can transmit the rotation from the gear 27 to the shaft 22 in a direction shown by the arrow A to feed the original M, and the free wheel 39 can transmit the rotation from the gear 28 to the shaft 23 in a direction shown by the arrow B to convey the original M, and further, the free wheels 40 can transmit the rotation from the gear 29a or 29b to the shaft 24 in a direction shown by the arrow A to eject the original M. The direction A is a direction to which the gears 27 and 29a are rotated when the motor 32 is driven in a direction shown by the arrow A, and the direction B is a direction to which the gears 28 and 29b are rotated when the motor 31 is driven in a direction shown by the arrow B.

Figure 5:
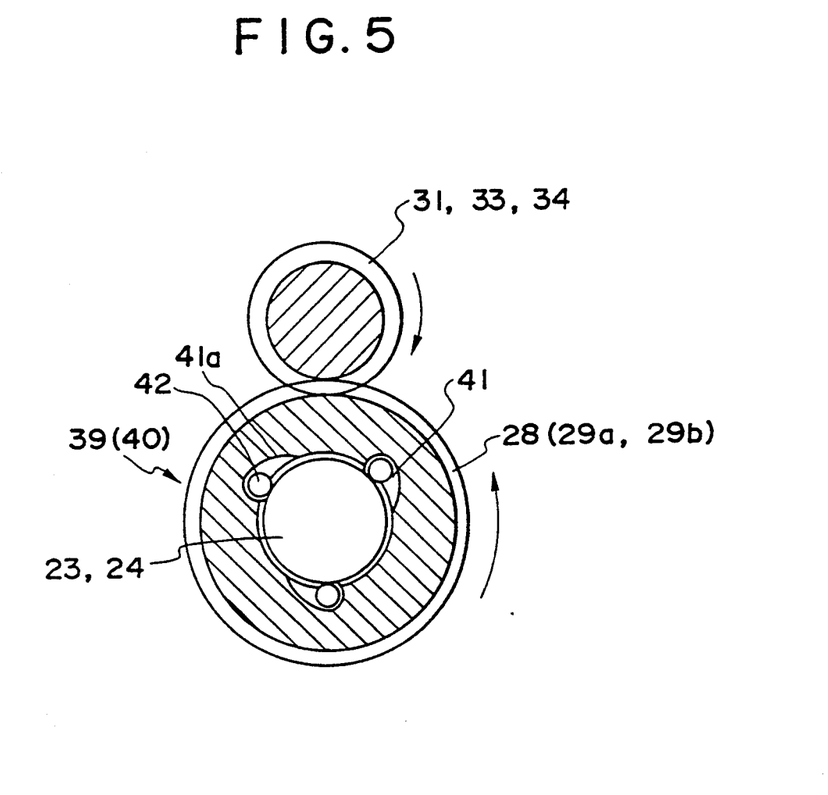
FIG. 5 is a sectional end view of a free wheel.

Incidentally, as shown in FIG. 5, in the free wheels 39 and 40, a plurality of same shaped recesses 41 are spaced equidistantly in the circumferential direction and tapered to become narrower toward the inner circumferences of the gears 28, 29a and 29b. Same shaped balls or rollers 42 are received in the respective recesses 41 so that the rotation forces can be transmitted from the gears 28, 29a and 29b to the shafts 23 and 24 in a direction (shown by the arrow) where the balls or rollers 42 are wedged between tapered surfaces 41a and the outer surfaces of the shafts 23, 24 and such rotation forces cannot be transmitted in the opposite direction.

Figure 6:
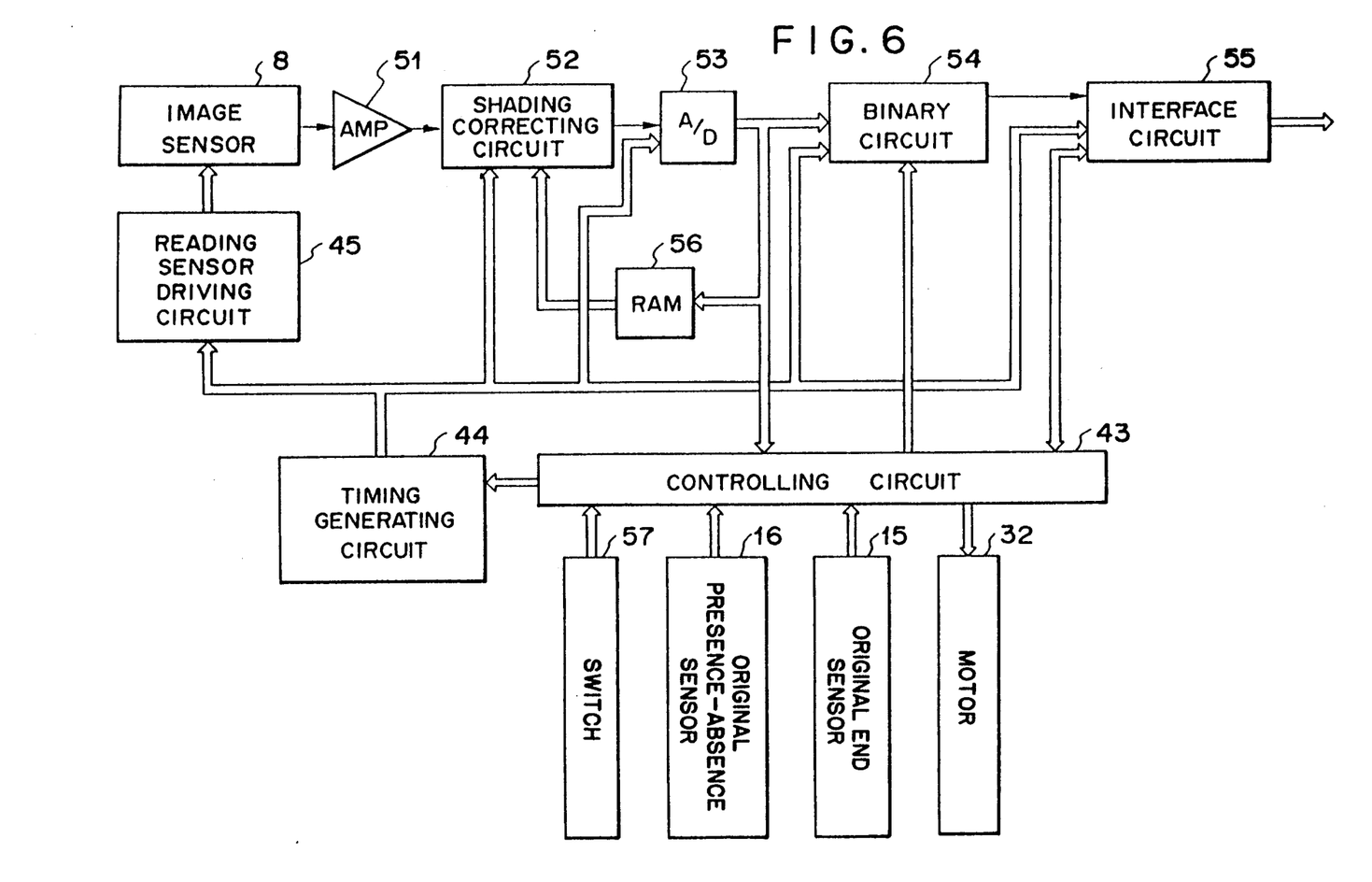
FIG. 6 is a block diagram of a control system.
Figure 7:
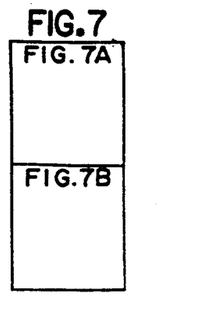
FIGS. 7A and 7B is a control flow chart.
Figure 7A:
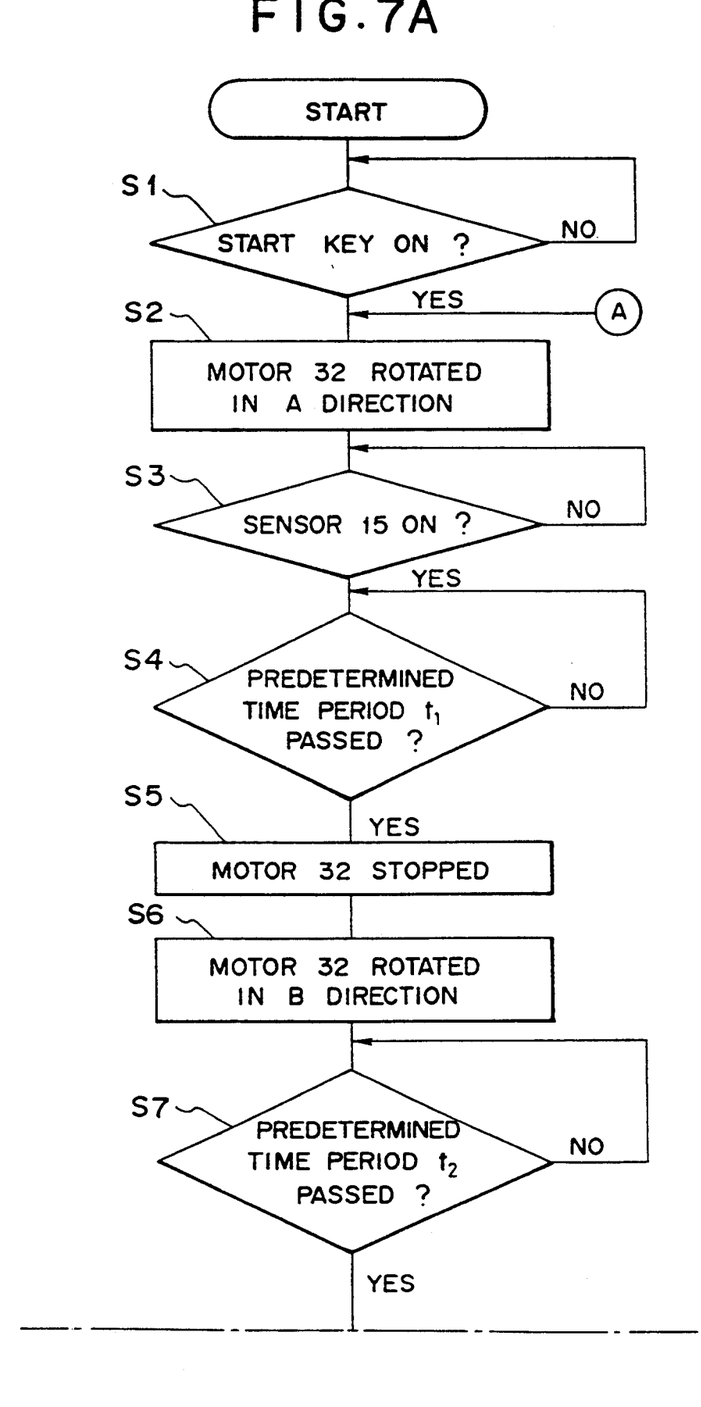
Figure 7B:
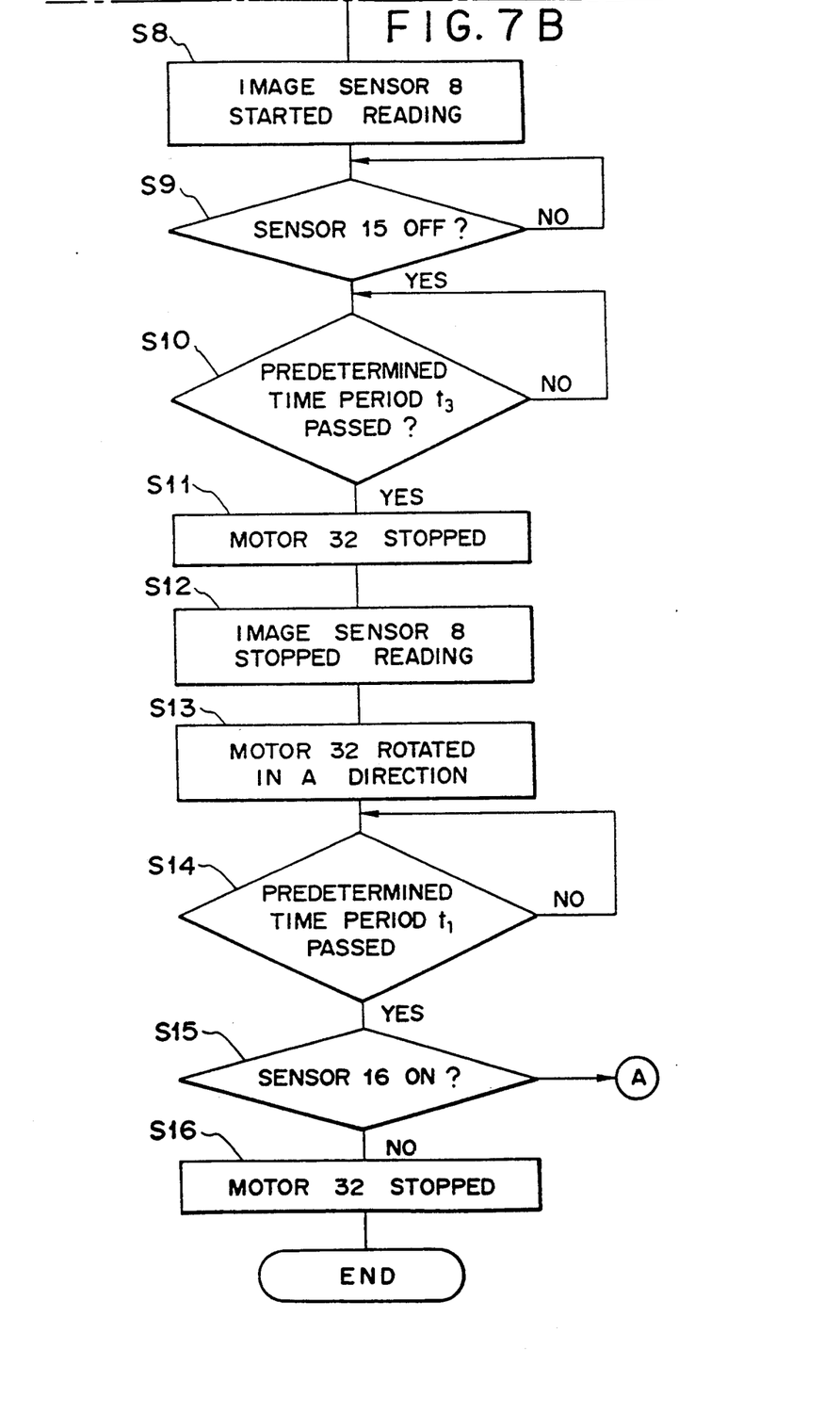

In FIG. 6 showing a control block diagram, the reference numeral 43 denotes a controlling circuit; 44 denotes a timing generating circuit for generating operation timing signals for various circuits on the basis of a signal from the controlling circuit; 45 denotes a reading sensor driving circuit for driving the image sensor 8 on the basis of the signal emitted from the timing generating circuit; and 51 denotes an amplifier for amplifying a signal from the image sensor 8. The reference numeral 20 denotes a shaping correcting circuit which corrects a magnitude of a signal portion (of the image signal from the amplifier) regarding a predetermined area corresponding to white in the image to a given value to eliminate the dispersion in the white image signal which is caused by the dispersion in light amount of the LED array regarding the white image, the smudge in the lens array and/or the dispersion in sensitivity of the photoelectric converting elements The reference numeral 53 denotes an A/D converter for converting the shaping-corrected image signal from an analogue signal to a digital signal; 54 denotes a binary circuit for converting the digital image signal into a binary signal (H or L); 55 denotes an interface circuit for outputting the binary image signal to an external host such as a computer, printer or the like; and 56 denotes a RAM in which the map data required for performing the shaping correction is stored Next, an operation of the original feeding and reading apparatus so constructed will be explained with reference to a flow chart shown in FIG. 7.

(i) When a plurality of originals M are stacked in the original tray 3 and a start key 57 is depressed (step S1), the motor 32 is rotated in the direction A in FIG. 4 (step S2). Consequently, the gear 28 is rotated in the opposite direction, but the shaft 23 cannot be rotated by the action of the free wheel 39, with the result that the conveying roller 9 is not also rotated. The feed rollers 4 are further rotated in the direction A (direction that the original M is fed) by the gears 30, 27, spring clutch 36, clutch barrel 35, pin 37 and shaft 22.

Further, the ejector rollers 11 are rotated in the direction A (direction that the original is ejected) by the gears 33, 29a, free wheels 40 and shaft 24 (Incidentally, the driving force through the gears 28, 34, 29b is not transmitted to the shaft 24 by the action of the free wheels 40).

Further, the pick-up rollers 7 are rotated in the same direction as the feed rollers 4 through the belt 26 and are pressed against the original M by means of the rocker arms 6.

Accordingly, the originals M are picked up by the pick-up rollers 7, and are fed by the feed rollers 4, and are separated one by one by the separating pad 5 and fed out. A leading end of the original is detected by the sensor 15 (step S3). Upon the generation of a detection signal of the sensor 15, after a predetermined time period $t_1$ (from a time when the leading end of the original M is abutted against a contacting line (reading line)

between the conveying roller 9 and the image sensor 8 and a time when a loop is formed in the original to correct the skew-feed of the original) has been elapsed, the motor 32 is stopped (steps S4, S5).

(ii) Then, when the motor 32 is rotated in the direction B (step S6), the shaft 23 is rotated in the direction B through the gear 28 and free wheel 39 whereby the original M is conveyed by the conveying roller 9. Incidentally, the feed rollers 4 and the pick-up rollers 7 are not driven by the spring clutch 35 (but, they rotatingly follow the movement of the original M).

On the other hand, the ejector rollers 11 are rotated in the direction B (direction that the original M is fed) through the gears 28, 34, 29b, free wheels 40 and shaft 24. When a predetermined time period $t_2$ is passed after the rotation of the motor 32 in the direction has been started, i.e., when the leading end of the original reaches a position which is at a downstream side of the contacting line between the conveying roller 9 and the image sensor 8 by a few millimeters (for example, 2 mm), the image sensor 8 starts to read the original (steps S7, S8), thereby reading the original being pinched and fed by the conveying roller 9 and the image sensor 8 through the image sensor 8. The leading end of the read original M reaches the ejector rollers 11. Thereafter, the original M is further fed by the synchronous movements of the conveying roller 9 and of the ejector rollers 11.

As the reading of the original M is continued, a trailing end of the original M is detected by the sensor 15(step S9). After a predetermined time period $t_3$ from the generation of a detection signal from the sensor 15 has been elapsed, i.e., immediately before the trailing end of the original M reaches the contacting line (for example, 2 mm this side), the rotation of the motor 32 and the reading operation of the image sensor 8 are stopped (steps S10, S11, S12).

(iii) Then, when the motor 32 is rotated in the direction A (step S13), as similar to the aforementioned case (i), the conveying roller 9 is stopped, and the feed rollers 4 and the ejector rollers 11 are rotated in the direction that the original M is fed.

In this case, after the motor 32 start to rotate in the direction A, since the pin 37 is rotated in the recess 38 (FIG. 4) by $\theta$ degrees with respect to the clutch barrel 35, the feed rollers 4 are not driven for a predetermined time period $T_1$. That is to say, during the predetermined time $T_1$ after the start of rotation of the motor 32, only the ejector rollers 11 are driven, and the original having the trailing end pinched by the conveying roller 9 and the image sensor 8 is extracted by the ejector rollers 11. Incidentally, the aforementioned predetermined time period $T_1$ is selected to be longer than a time period $T_2$ required for shifting the original by a sufficient distance L (FIG. 1) to eject it onto the ejector tray 14. Accordingly, until the original has completely been ejected onto the ejector tray 14, the next original M is not fed.

When it is judged that the predetermined time period $T_1$ has been passed in a step S14, the presence/absence of the original M in the original tray 3 is detected by the sensor 16 (step S15). If absent, in a step S16, the motor 32 is stopped and the operation is finished. On the other hand, if &he next original is present in the original tray, the sequence returns to the step S2, and the aforementioned operations or sequences are repeated.

Next, as shown in FIG. 6, the timing for forming the loop in the original (after the leading end of the original is abutted against the contacting line between the conveying roller and the image sensor by the detection signal from the sensor 15 detecting the leading end of the original) in the above case (i) and the timing for stopping the motor 32 (immediately before the original M reaches the contacting line by the detection signal from the sensor 15 detecting the trailing end of the original) in the above case (ii) are controlled by the timing generating circuit 44 through the controlling circuit 43, and the motor 32 is also stopped by the original absence signal from the sensor 16 through the controlling circuit 43. Further, the reading of the image sensor 8 of contact type is controlled by the reading sensor driving circuit 45 through the controlling circuit 43 and the timing generating circuit 44.

Incidentally, while the single idle gear 33 was interposed between the pinion gear 31 and the gear 29a, an odd number (for example three or five) of idle gears may be used, and, while the two gears 28, 34 were interposed between the pinion gear 31 and the gear 29b, an even number (including zero) of gears may be interposed. Further, the gear 29a and the gear 29b may be exchanged. In a word, when the motor 32 can be reversibly rotated, by interposing two free wheels 40, it is designed that the shaft 24 is always rotated in a clockwise (FIG. 4) direction.

Further, regarding the free wheels 39, 40 and the spring clutch 46, any one of various known one-way rotating means may be selected.

Figure 8:
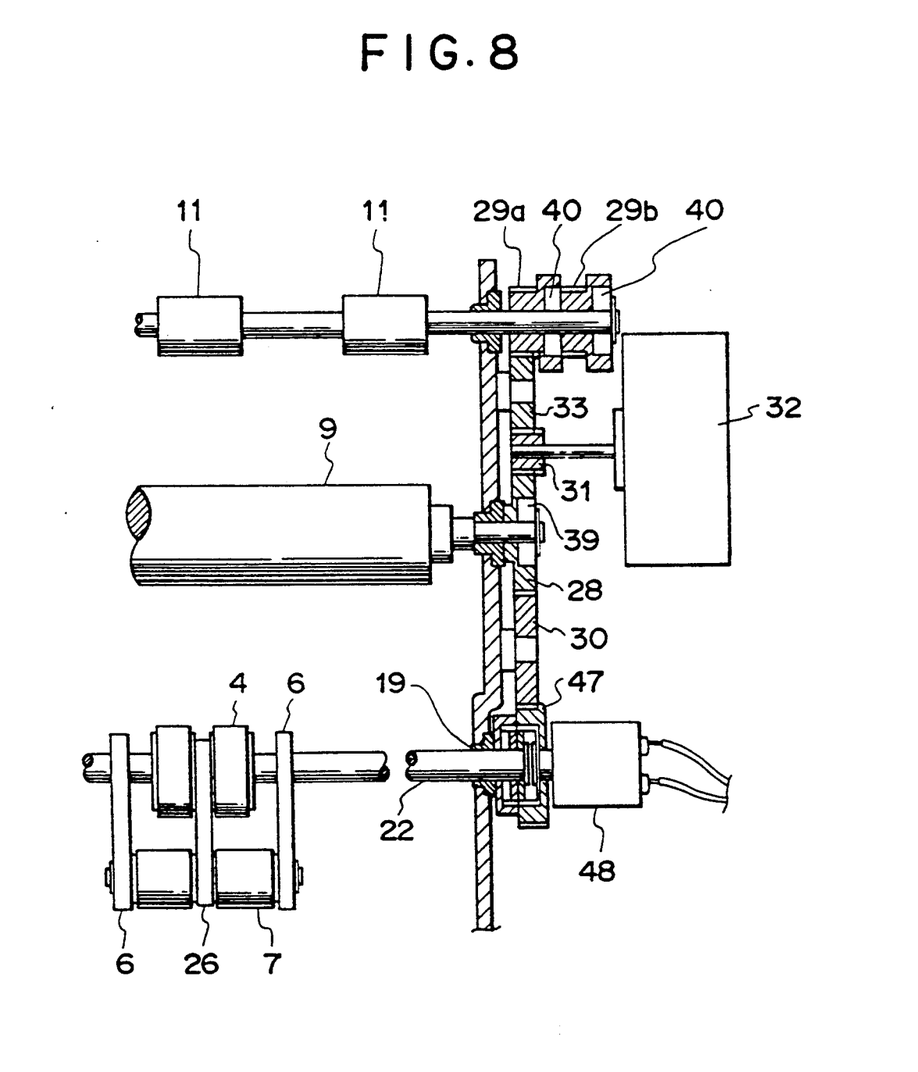
FIG. 8 is a sectional plan view of a drive transmitting mechanism according to another embodiment.

Next, another embodiment of the present invention will be explained with reference to FIGS. 8 and 9. The same functional and constructional elements as &hose in the previous embodiment are designated by the same reference numerals used in the previous embodiment and the explanation thereof will be omitted.

In this embodiment, the idle gear 30 is meshed with a gear 47, and an electro-magnetic clutch 48 is interposed between the gear 47 and the shaft 22. And, as shown in FIG. 9, the timing provided by the aforementioned recess 38 and the timing after the sensor 15 detects both ends of the original M are controlled similar to the previous embodiment, by turning ON or OFF the electro-magnetic clutch 48 by the timing generating circuit 44 through the controlling circuit 43

In the above-mentioned two embodiments, since the operation of the conveying roller 9 is shortened, and the remaining operation is effected by the ejector rollers 11 in lieu of the conveying roller, and during a part of the operation of the conveying roller 9 the ejector rollers 11 cooperate with the conveying roller, it is possible to reduce the wear of the conveying roller 9. Further, since the feed rollers 4 are not driven when the original M is ejected, the load of the motor 32 is also reduced. In addition, it is possible to drive the whole apparatus 1 by a single motor 32, thus making the apparatus 1 small-sized and inexpensive considerably.

Figure 10:
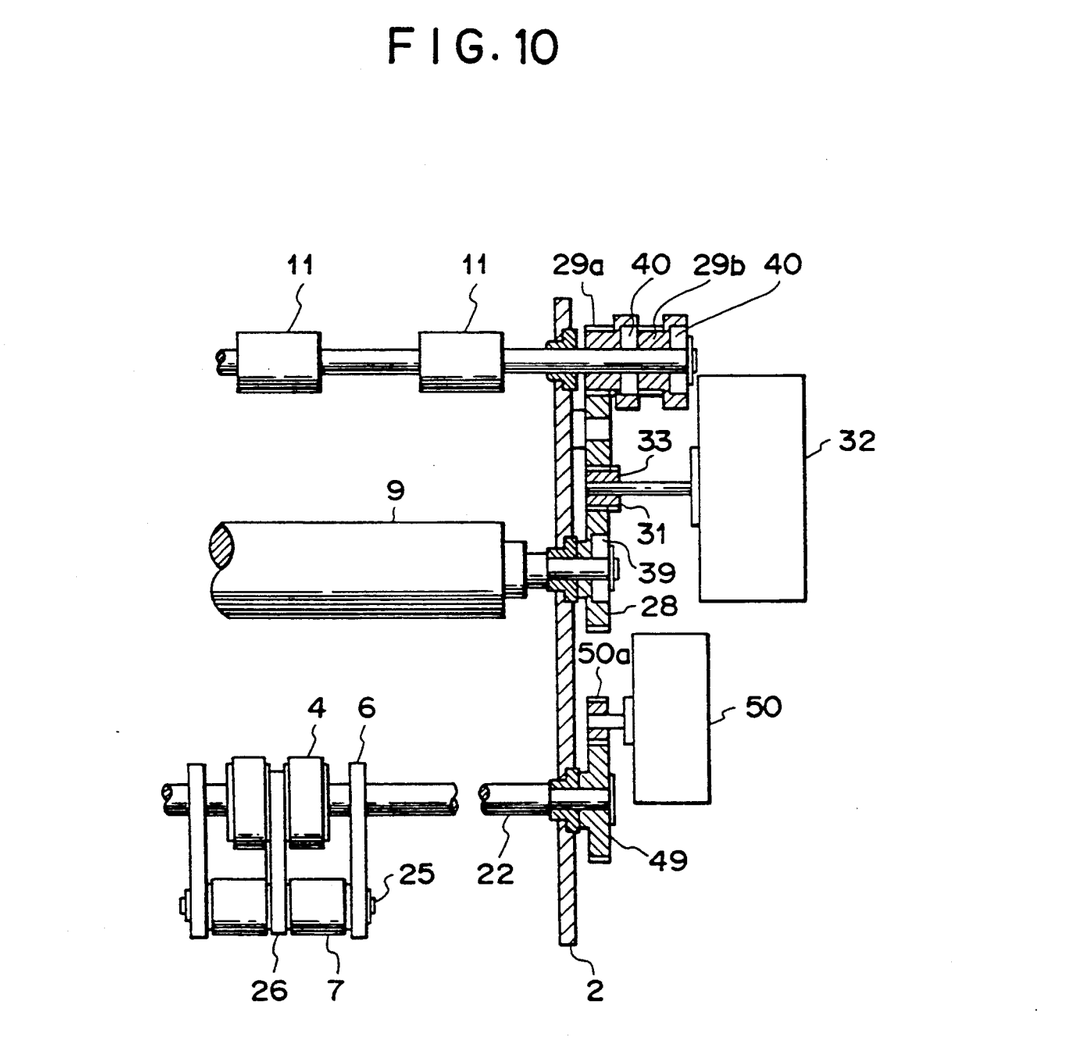
FIG. 10 is a sectional plan view of a drive transmitting mechanism according to a further embodiment.
Figure 11:
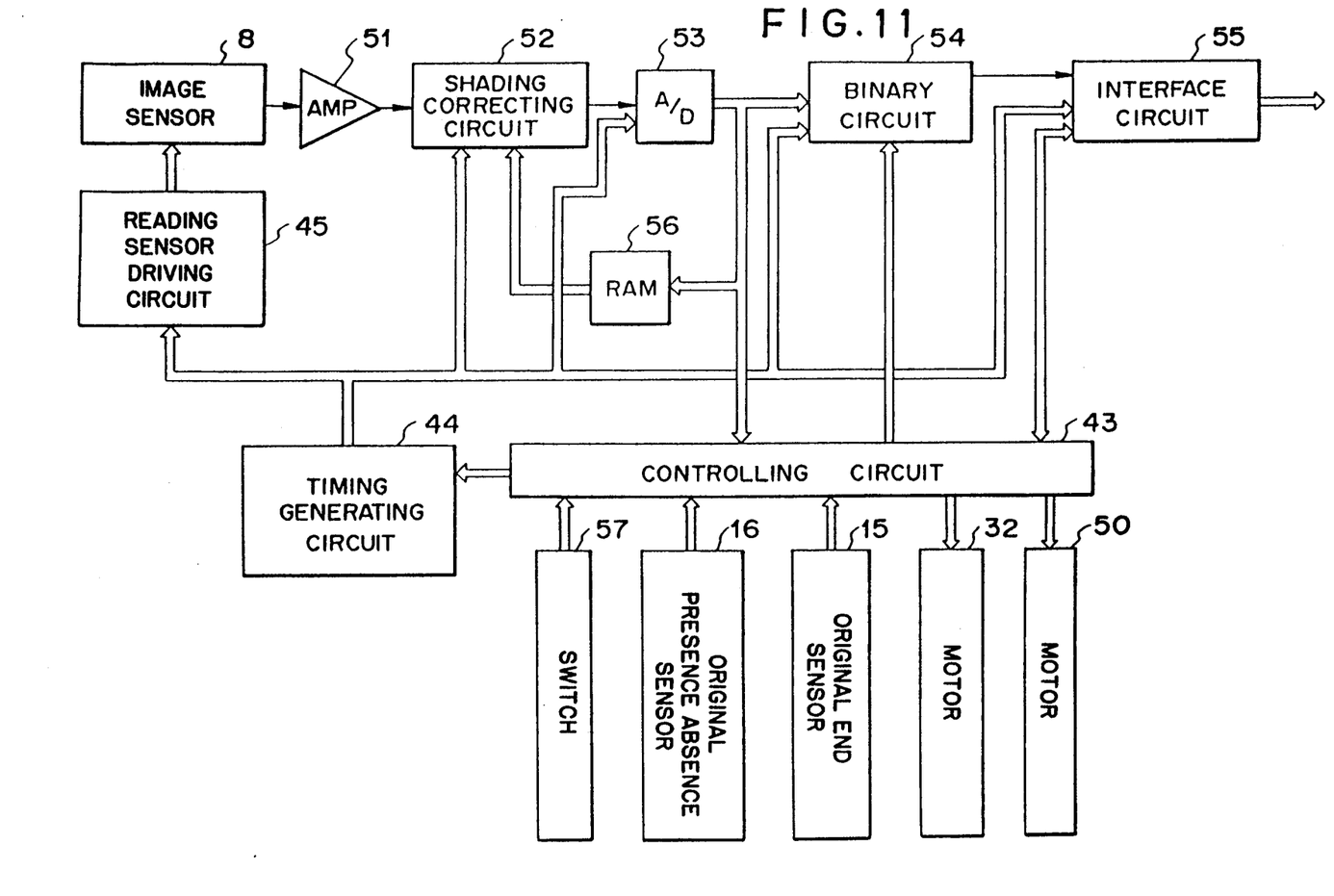
FIG. 11 is a block diagram of a control system regarding the mechanism of FIG. 10.

Next, a further embodiment of the present invention will be explained with reference to FIGS. 10 and 11.

In this embodiment, a gear 49 is attached to the outboard end of the shaft 22, and a motor 50 having a motor shaft on which a pinion 50a meshed with the gear 49 is mounted on the frame 2. And, the operation of the feed rollers 4 as mentioned above is controlled by turning ON or OFF the motor 50 by the timing generating circuit 44 through the controlling circuit 43.

In the illustrated embodiments, the conveying roller 9 was stopped immediately before the trailing end of the original M was passed through the contacting area (nip) between the conveying roller 9 and the image sensor 8. However, the present invention is not limited this, but the conveying roller 9 may be stopped just when or immediately after the trailing end of the original has passed through the nip, because the wear of the conveying roller 9 and of the guide member 8f can be effectively prevented before the trailing end of the original passes through the ejector rollers 11. Alternatively, the conveying roller 9 may be stopped before the ejector rollers 11 are stopped.

What is claimed is:

1. An original reading apparatus comprising:
    an image reading means having a guide surface for guiding an image surface of an original and adapted to read an image on the original being guided by said guide surface;
    a first feeding means for feeding the original while pressing the original against said guide surface of said image reading means;
    a driving means for driving said first feeding means;
    a second feeding means disposed at a downstream side of said first feeding means in an original feeding direction and adapted to feed the original fed by said first feeding means; and
    a control means for controlling said driving means in such a manner that said first feeding means is stopped before a trailing end of the original fed by said second feeding means has passed through a nip between said first feeding means and said guide surface.

2. An original reading apparatus according to claim 1, wherein said image reading means includes a photoelectric converting element for converting a read image into an electric signal.

3. An original reading apparatus according to claim 2, wherein said image reading means includes a transparent member, and said guide surface is comprised of a surface of said transparent member.

4. An original reading apparatus according to claim 3, further including a lens array for focusing the image on the original being guided by said guide surface onto said photoelectric converting element.

5. An original reading apparatus according to claim 1, wherein said first feeding means comprises a rotary member rotating on the original while contacting the latter.

6. An original reading apparatus according to claim 1, further including a detecting means for detecting the original.

7. An original reading apparatus according to claim 6, wherein said control means controls said driving means on the basis of a detection signal from said detecting means.

8. An original reading apparatus according to claim 1, wherein said control means stops the driving of said first feeding means by means of said driving means while the original is fed by said second feeding means and before the trailing end of the original passes said first feeding means.

9. An original reading apparatus comprising:
    an image reading means having a guide surface for guiding an image surface of an original and adapted to read an image on the original being guided by said guide surfaces;
    a first feeding means for feeding the original while pressing the original against said guide surface of said image reading means;
    a driving means for driving said first feeding means;
    a second feeding means disposed at a downstream side of said first feeding means in an original feeding direction and adapted to feed the original fed by said first feeding means; and
    a detecting means for detecting that the original has passed a predetermined position at an upstream side of said first feeding means; and
    a control means for controlling said driving means in such a manner that said first feeding means is stopped on a basis of a detection signal from said detecting means before a trailing end of the original being fed by said second feeding means has passed through a nip between said first feeding means and said guide surface.

10. A original reading apparatus according to claim 9, wherein said second feeding means is disposed at a position where it can feed the original fed by said first feeding means when the driving of said first feeding means is stopped.

11. An original reading apparatus according to claim 9, wherein said image reading means includes a photoelectric converting element for converting a read image into an electric signal 12. An original reading apparatus according transparent member, and said guide surface comprises a surface of said transparent member.

13. An original reading apparatus according to claim 12, further including a lens array for focusing the image on the original being guided by said guide surface onto said photoelectric converting element.

14. An original reading apparatus according to claim 9, wherein said first feeding means comprises a rotary member rotating on the original while contacting the latter.

15. An original reading apparatus according to claim 9, wherein said second feeding means conveys the original while pinching the latter.

16. An original reading apparatus according to claim 9, further including a stacking means on which the originals are stacked; and a feed means for feeding a single original from said stacked originals to said first feeding means one by one.

17. An original reading apparatus according to claim 9, wherein said detecting means detects the presence/absence of the original at an upstream side of said first feeding means.

18. An original reading apparatus according to claim 17, wherein said control means stops the driving of said first feeding means after a predetermined time period has elapsed from a time when said detecting means changes its condition from detection of the presence of the original to detection of absence of the original.

19. An original reading apparatus according to claim 18, wherein said image reading means stops the reading of the image after a second predetermined time period has elapsed from a time when said detecting means changes its condition from detection of the presence of the original to detection of absence of the original.

20. An original reading apparatus comprising:
    a stacking means for stacking originals;
    a feed means for feeding the originals stacked in said stacking means;
    an image reading means having a guide surface for guiding an image surface of the original fed by said feed means and adapted to read an image on the original being guided by said guide surface;
    a first feeding means for feeding the original while pressing the original against said guide surface of said image reading means;
    a driving means for driving said first feeding means;

a second feeding means disposed at a downstream side of said first feeding means in an original feeding direction and adapted to feed the original fed by said first feeding means;

a detecting means for detecting that the original has passed a predetermined position at an upstream side of said first feeding means; and a control means for controlling said driving means in such a manner that said first feeding means is stopped on the basis of a detection signal from said detecting means before a trailing end of the original being fed by said second feeding means has passed through a nip between said first feeding means and said guide surface.

21. An original reading apparatus according to claim 1, wherein said second feeding means comprises a pair of rotary members for feeding the original while pinching the original therebetween.

22. An original reading apparatus according to claim 9, wherein said second feeding means comprises a pair of rotary members for feeding the original while pinching the original therebetween.

23. An original reading apparatus comprising:

an image reading means having a guide surface for guiding an image surface of an original and adapted to read an image on the original being guided by said guide surface;

a first feeding means for feeding the original while pressing the original against said guide surface of said image reading means;

a driving means for driving said first feeding means with a driving force;

a second feeding means disposed at a downstream side of said first feeding means and adapted to feed the original fed by said first feeding means; and a control means for controlling said driving means in such a manner that said first feeding means is stopped before a trailing end of the original fed by said first feeding means has passed a nip between said first feeding means and said guide surface.

24. An original reading apparatus according to claim 23, wherein said image reading means comprises a photoelectric converting element for converting a read image into an electrical signal.

25. An original reading apparatus according to claim 24, wherein said image reading means comprises a transparent member, and said guide surface comprises a surface of said transparent member.

26. An original reading apparatus according to claim 25, further comprising a lens array for focusing the image on the original being guided by said guide surface onto said photoelectric converting element.

27. An original reading apparatus according to claim 23, wherein said first feeding means comprises a rotary member rotating on the original while contacting the original.

28. An original reading apparatus according to claim 23, further comprising a detection means for detecting the original.

29. An original reading apparatus according to claim 28, wherein said driving means is controlled by said control means on the basis of a detection signal from said detection means.

30. An original reading apparatus according to claim 23, wherein the driving force supplied to said first feeding means is stopped by said control means before a trailing end of the original being fed by said second feeding means has passed through said first feeding means.

31. An original reading apparatus according to claim 23, wherein said second feeding means comprises a pair of rotary members for feeding the original while pinching the original therebetween.

* * * * *

UNITED STATES PATENT AND TRADEMARK OFFICE
CERTIFICATE OF CORRECTION

PATENT NO. : 5,267,058
DATED : November 30, 1993
INVENTOR(S) : JUNICHI SATA

It is certified that error appears in the above-indentified patent and that said Letters Patent is hereby corrected as shown below:

IN THE DRAWINGS

SHEET 9 OF 12

Figure 9:
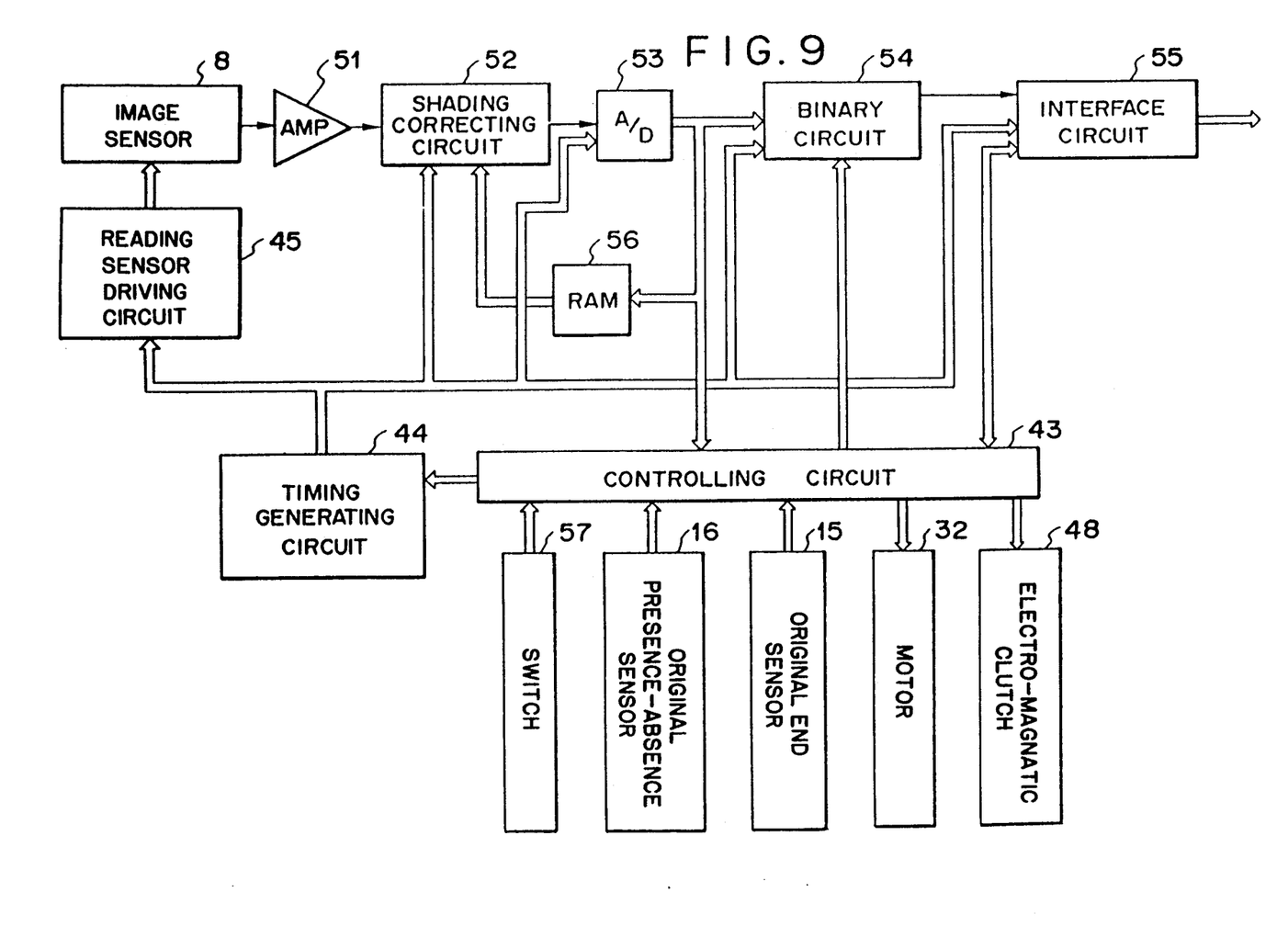
FIG. 9 is a block diagram of a control system regarding the mechanism of FIG. 8.

FIG. 9, "MAGNATIC" should read --MAGNETIC--.

COLUMN 1

Line 27, "sensor 65 the" should read --sensor 65 of the--.
Line 58, "sensor 65 the" should read --sensor 65 of the--.
Line 67, "apparatus" should read --the apparatus--.

COLUMN 3

Line 11, "original" should read --original.--.

COLUMN 4

Line 30, "analogue" should read --analog--.
Line 37, "stored" should read --stored.--.

COLUMN 5

Line 16, "direction" should read --direction B--.
Line 42, "start" should read --starts--.
Line 62, "&he" should read --the--.

COLUMN 6

Line 30, "&hose" should read --those--.
Line 42, "circuit 43" should read --circuit 43.--.
Line 68, "this," should read --to this,--.

UNITED STATES PATENT AND TRADEMARK OFFICE
CERTIFICATE OF CORRECTION

PATENT NO. : 5,267,058
DATED : November 30, 1993
INVENTOR(S) : JUNICHI SATA

It is certified that error appears in the above-indentified patent and that said Letters Patent is hereby corrected as shown below:

COLUMN 7

Line 62, "surfaces;" should read --surface;--.

COLUMN 8

Line 13, "A" should read --An--.
Line 22, "according transpar-" should read --according to claim 11, wherein said image reading means includes a transpar- --.

Signed and Sealed this

Twelfth Day of July, 1994

Attest:

BRUCE LEHMAN

Attesting Officer    Commissioner of Patents and Trademarks